United States Patent Office 3,526,970
Patented Sept. 8, 1970

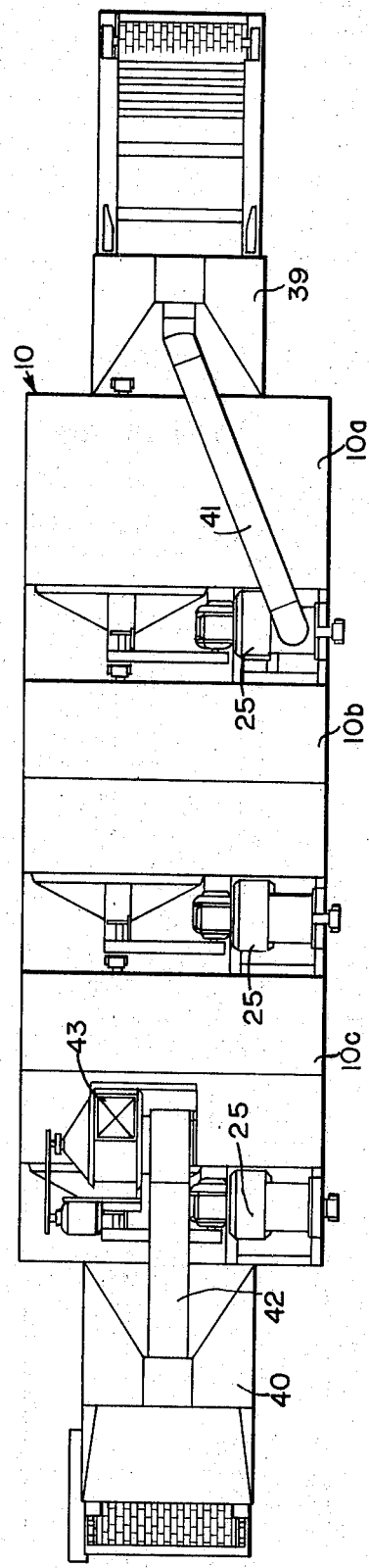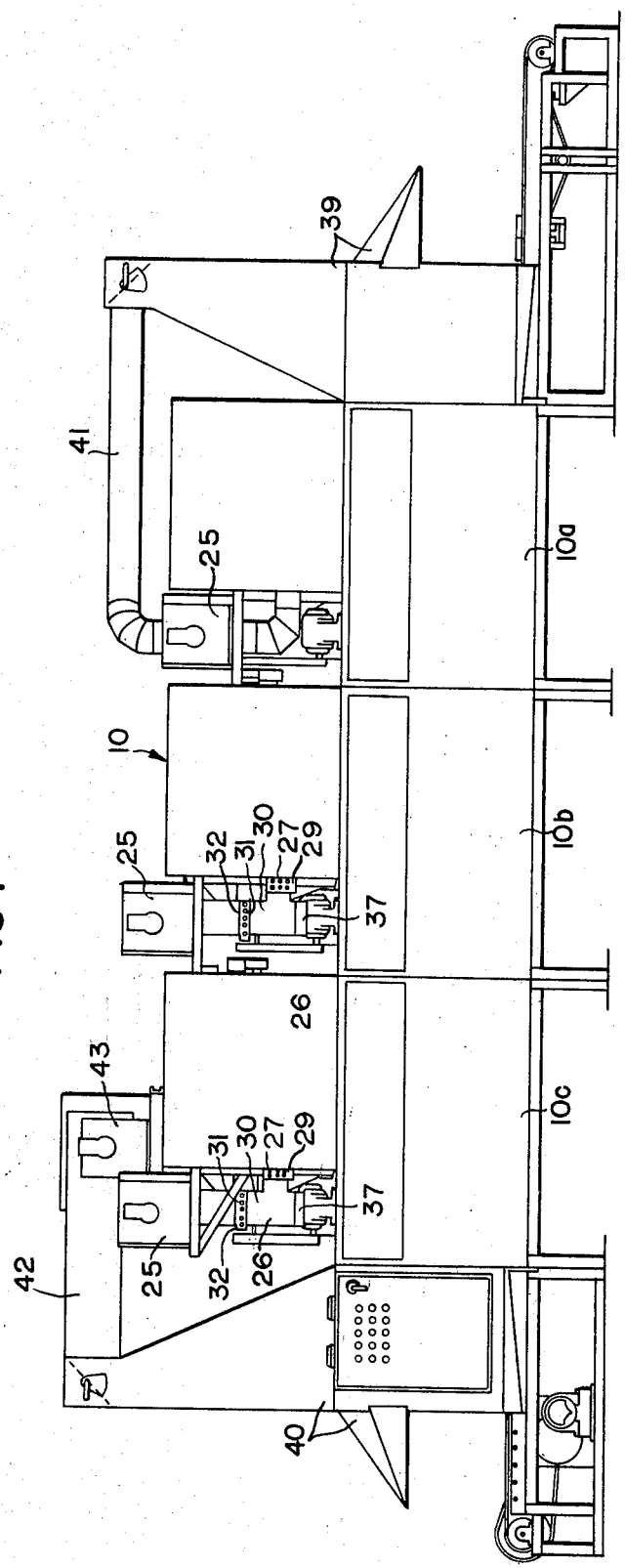

3,526,970
DRYING OVEN AND VOLATILE CONDENSER
William B. Harrison, Dedham, and Clifford F. Tirrell, South Weymouth, Mass., assignors to W. R. Grace & Co., Cambridge, Mass., a corporation of Connecticut
Filed Apr. 11, 1968, Ser. No. 720,533
Int. Cl. F26b 21/02, 21/06
U.S. Cl. 34—73                            4 Claims

ABSTRACT OF THE DISCLOSURE

A drying oven particularly adapted for curing volatile compositions is disclosed. The oven has stationary, perforated side walls, at least one of which has a second adjacent, movable, similarly-perforated wall to regulate the flow of air through it. The oven further is provided with a perforated exhaust stack containing a series of baffle plates whereby a cooling medium, e.g. air, is introduced into the stack and odorous volatiles are condensed and collected.

---

This invention relates to curing ovens, and particularly to a curing oven designed to have accurately controllable air flows and combined exhaust passage and vapor condensing means which, in large measure, prevent the escape of vaporized components of the material cured in the oven. The oven of the invention is especially suitable for curing sealing compositions employed in container closures.

Container closures usually comprise a metal "shell" shaped to close the opening in the container, and a gasket which seals the joint between the container and the closure when the closure is forced into its sealing position. Commonly, the gasketing material is an elastomeric substance often derived from natural or artificial rubber. Quite commonly also, the gasketing material is composed of vinyl chloride.

The sealing composition is applied to the shell in liquid form, usually by ejecting a jet of the composition on a rotating closure so that an annular gasket is formed. But to convert the gasket into a solid substance, a heating step is necessary. In this step, the suspending fluid is volatilized if a liquid dispersion has been made, and frequently the dry deposit is vulcanized by continued heating. If the sealing compound is a plastisol, heating causes fluxing to take place.

In the curing of rubber base compounds and in the fluxing of plastisols, a certain amount of volatile material which is relatively odorous is driven off. The odor is not very noticeable in the case of closures for food cans. However, in the case of closures for "general line" cans not intended for food stuffs, odorous softeners may be used in association with the rubber compounds and esters containing disagreeable volatiles may be used in the plastisols because they are materially cheaper than the carefully de-odorized products necessary for food stuff closures. Although only a very small amount of odorous substance is released from each closure, the total amount released is large and becomes a most objectionable nuisance to the surrounding area.

The oven design herein disclosed obviously can be adapted to many types of ovens such as for paint drying, vulcanizing, etc. As a particularly preferred embodiment, an oven designed to cure the gaskets of aerosol bomb closures at a high production rate and comprising three heating oven sections, each heating at a different temperature, is described below.

The particular sealing composition which the oven described below is designed to cure requires a residence time of three hours. Input into the oven is 1,000 closures a minute. Consequently 180,000 closures occupy the oven at all times that it is in operation.

The structure of the oven of the invention and its vapor-condensing means will become apparent from the specification, and from the drawings in which:

FIG. 1 is a top plan view of an entire closure curing oven which comprises three heating oven sections;

FIG. 2 is a side elevational view of the oven;

Figure 3:
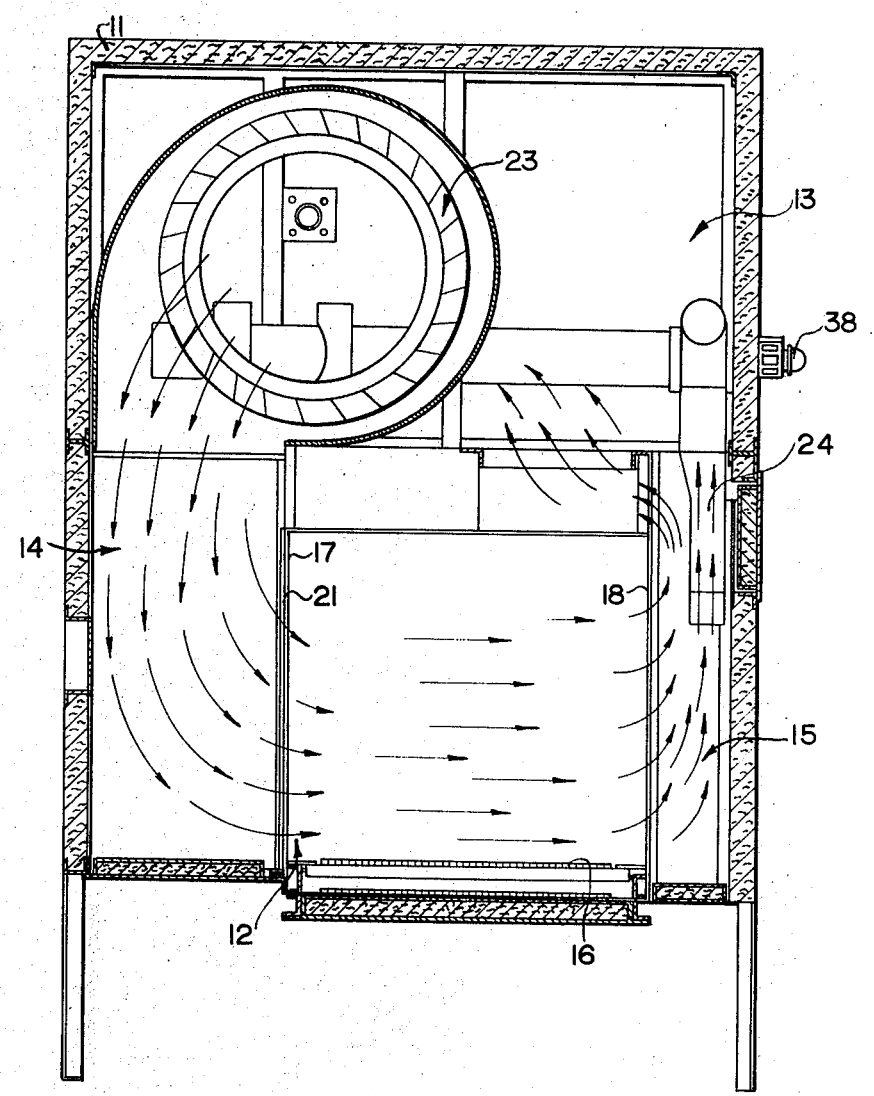
FIG. 3 is a transverse, vertical section through one of the heating oven sections.

The oven 10 comprises three substantially identical heating ovens 10a, 10b, and 10c connected in series to form a tunnel structure. As shown in FIG. 3, each heating oven section has insulated walls 11—11 and partitions which divide the oven into four sections: the curing or drying chamber 12, the burner and fan chamber 13, the plenum chamber 14, and the exhaust chamber 15.

A continuous belt 16 on which trays carrying the closures are stacked, runs longitudinally through all drying chambers 12. Sometimes, however, stacks of closures are placed directly on the belt 16. In the specific embodiment herein described, the length of the combined drying chambers 12 is 18 feet, the width of the drying chamber is 3 feet 4 inches, and the height of the drying chamber is 3 feet. The closures stacked in ranks upon the belt 16, travel through all three of the drying chambers 12.

The flow of air through the drying chambers 12 is from side to side, and both longitudinal walls 17 and 18 of the drying chamber include many perforations 19 to allow the inflow and outflow of heated air.

Figure 4:
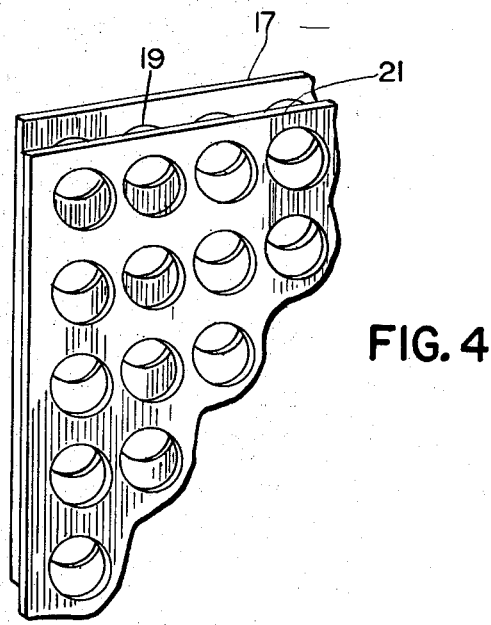
FIG. 4 is a detail showing the adjustable means used to control the flow of air across the heating oven sections.
Figure 5:
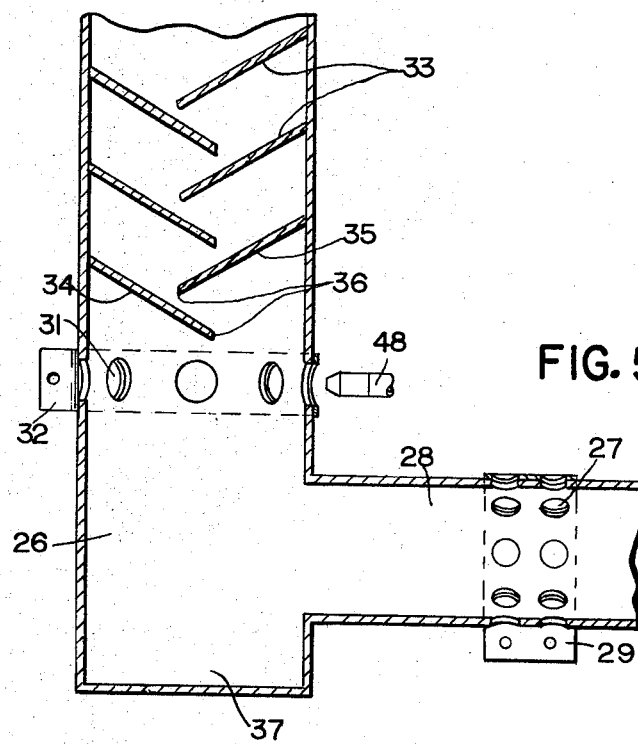
FIG. 5 is a vertical section through the exhaust stack and showing optional mist nozzles.

As the detail showing of FIG. 4 indicates, flow through the chamber may be adjusted by a sliding shutter 21 generally co-extensive with the wall 17 and perforated in the same pattern. Shutter 21 may be adjusted by sliding it vertically (or longitudinally as the case may be) a short distance so that a portion of each perforation 19 in walls 17 can be covered by the shutter 21. By this means the air flow may be regulated.

The exit wall 18 of the chamber 12 can be a duplicate of the entrance structure, and outward flow of air can be adjusted by the proper position of a like perforated shutter. On the other hand, it can be, and preferably is, a perforated but unshuttered wall.

Exiting air passes into the exhaust chamber 15 which leads into the intake of a large air-foil blade type air blower 23. The discharge from the blower is fed directly into the inflow or plenum chamber 14. Although a very considerable amount of the air circulating through the drying oven sweeps around again and again, a certain amount must be discharged, and the discharge is secured by projecting an exhaust duct 24 downwardly into the exhaust chamber 15. The exhaust duct 24 leads into the intake of an exhaust blower 25 which, if desired, may be operated at variable speeds. Blower 25 is usually adjusted to exhaust approximately 10% of the recirculating air.

A cooling medium, e.g. fresh room-temperature air, is allowed to enter the exhaust or discharge stack, the arrangement essentially being a capped T 26 having perforations or ports 27 in its branch 28, a horizontal portion of the exhaust duct 24. The amount of air admitted through perforations 27 can be adjusted by sliding similarly-perforated sleeve 29 around the branch 28. The vertical portion 30 of the exhaust duct above the T likewise admits room temperature air through the ports 31 which may be regulated by perforated and rotatable collar 32. Consequently, the volume of exhaust in the discharge stack may be controlled and can be greatly diluted by fresh air inflow. As a result of this dilution by the cooling medium the temperature of the exhaust gases is reduced to such a degree that the vapors of the volatile components in the exhaust gas are condensed by chilling.

To enhance condensation of the volatile exhaust gases the air admitted through ports 27 and 31 can be pre-cooled or chilled prior to entry into the discharge stack. Also, water, which has been introduced into the stack through the use of air saturated with water vapor, or by means of one or more mist nozzles 48, suitably mounted and directed into ports 27 and 31, can be used to enhance cooling and to wash condensed material off of baffles 33, described below.

Just above the ports 31, a series of baffles 33—33 projects into the exhaust duct. Baffles 33 extend more than half way across the duct and are alternately positioned at intervals so that the outflowing air impinges on the lower face 34 of the lowermost baffle, the lower face 35 of the second baffle, and then flows following a zig-zag interference path through the remaining succeeding baffles. The baffles are coated with condensed matetrial, e.g. plasticizers, which drop off the ends 36—36 and is collected in a sump portion 37 of the exhaust duct 24.

Fume leakage through the input and discharge ends of the oven is prevented by entrance 39 and exhaust 40 extensions of the oven structure which are essentially hoods. The entrance hood 39 is connected by a horizontal duct 41 to the first zone exhaust blower 25. The exit hood 40 is connected by a horizontal duct 42 to its exhaust fan 43. The structure of the building and the ceiling clearance may change this particular arrangement materially.

Heating is accomplished by burners 38, the flame tubes of which are located in the burner and fan chambers 13. Flame, fan speed, and safety controls are conventional and are not part of the present invention.

The arrangement of oven walls 17 and 18 and shutter 21 permits an accurate adjustment of air flow in each of the oven sections. Since the volume of recirculating air which is to be exhausted can be adjusted, and its temperature controlled by dilution with cool room air, the concentration of objectionable material in the stack exhaust is enormously cut down. Despite the tremendous volume of material that passes through the oven hourly, the ovens can be made to operate without releasing nauseous odors to the atmosphere.

It is obvious that whether the oven comprises one or a multiple of heating chambers depends upon the heat or heats required properly to dry, cure, or flux the closure and the volume of through-put which the oven must handle. Single-heat-chamber models are equally useful and effective, and commonly are used on crown and can closures.

It is claimed:
1. A drying oven comprising
   (a) a drying chamber of rectangular cross-section, the vertical walls of said chamber being pierced with a multiplicity of circular apertures,
   (b) a blower and burner chamber,
   (c) burner means for heating air in said chamber,
   (d) a plenum chamber extending outwardly beyond one vertical wall,
   (e) a blower arranged to push hot air into said plenum chamber,
   (f) shutters perforated with circular holes, associated with at least one of the vertical walls of the drying chamber, said wall being that between the plenum chamber and the drying chamber and said shutter holes being distributed in the same pattern as those on said vertical wall,
   (g) an exhaust chamber extending outwardly beyond the second longitudinal vertical wall and in communication with the intake of said blower,
   (h) an exhaust stack projecting into said exhaust chamber adapted to admit predetermined quantities of circulating hot air into said stack,
   (i) power-driven gas-exhaust means,
   (j) orifices admitting predetermined amounts of a cooling medium into the exhaust stack thereby to reduce the temperature of the exhausted gas,
   (k) a portion of the exhaust stack beyond said orifices being vertical and containing alternately overlapping baffles whereby the cool stream of gas, in passing around and over said baffles, may deposit condensed volatiles on said baffles, and
   (l) means to collect the volatiles so condensed and deposited.

2. A drying oven having a drying chamber, a transport belt for moving articles through the chamber, the said chamber having perforated side walls, a shutter arranged adjustably to close the perforations in at least one of said side walls, a blower and burner chamber, a plenum chamber, an exhaust chamber, an exhaust duct projecting into said exhaust chamber, means to adjust the amount of exhaust gas entering said duct, power-driven exhaust means incorporated in said duct, means including orifices in said duct arranged to dilute and to cool the exhausted hot air with a cooling medium, and a series of baffles in said duct arranged to contact and collect condensed vapors in said exhaust air stream.

3. The apparatus of claim 2 wherein the cooling medium for the exhausted hot air is selected from the class consisting of air at ambient temperature, chilled air and water vapor saturated air.

4. The apparatus of claim 3 wherein the air used as cooling medium is accompanied by a mist of water.

References Cited

UNITED STATES PATENTS

| | | | |
|---|---|---|---|
| 2,501,979 | 3/1950 | Wood et al. | 34—79 XR |
| 3,281,958 | 11/1966 | Lambert et al. | 34—222 |
| 3,374,106 | 3/1968 | Thygeson | 34—216 XR |

FOREIGN PATENTS

| | | |
|---|---|---|
| 297,383 | 4/1917 | Germany. |
| 488,886 | 1/1954 | Italy. |

FREDERICK L. MATTESON, JR., Primary Examiner

H. B. RAMEY, Assistant Examiner

U.S. Cl. X.R.
34—79, 213, 222, 225